(No Model.) J. W. POLER.
TIME RECORDER.

No. 547,156. Patented Oct. 1, 1895.

Witnesses:
Chas. W. LaPorte.
M. Bellamy

Inventor:
John W. Poler
by Doubleday & Bliss
Attys (No Model.)

J. W. POLER.
TIME RECORDER.

No. 547,156.

5 Sheets—Sheet 3.

Patented Oct. 1, 1895.

Witnesses:
Chas. A. LaPorte.
M. B. May

Inventor:
John W. Poler
by
Doubleday & Bliss attys.

ANDREW B. GRAHAM. PHOTO-LITHO. WASHINGTON D.C.

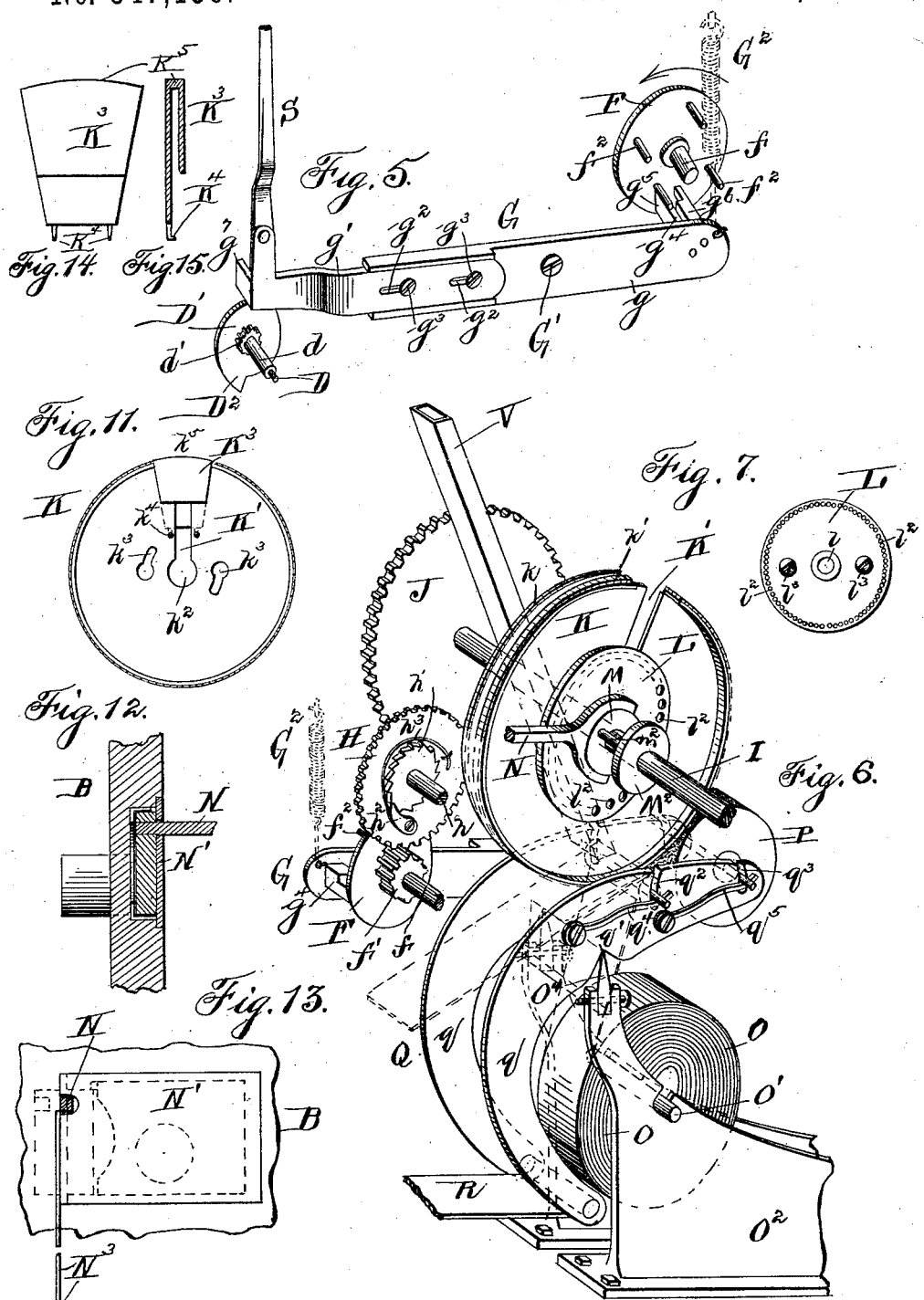

(No Model.) 5 Sheets—Sheet 5.
J. W. POLER.
TIME RECORDER.
No. 547,156. Patented Oct. 1, 1895.
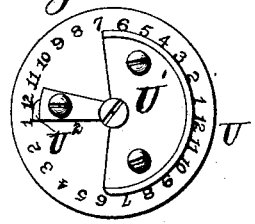
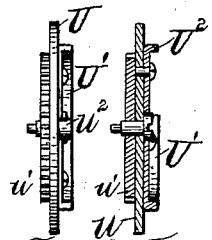
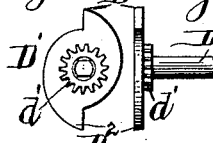
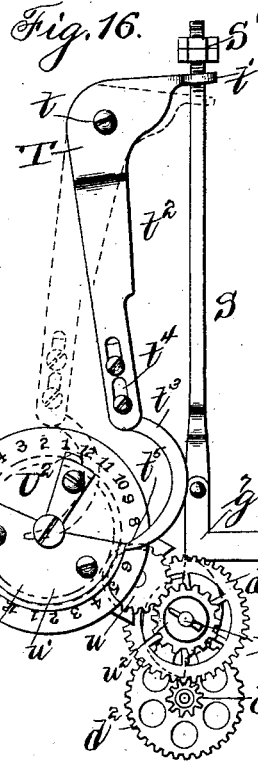
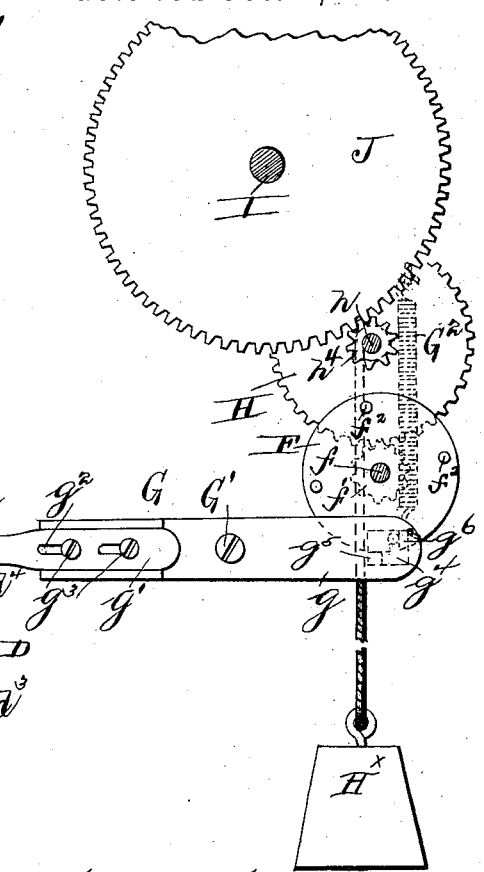
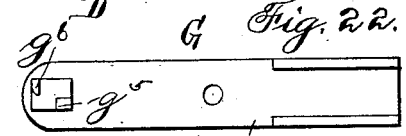
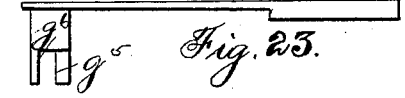
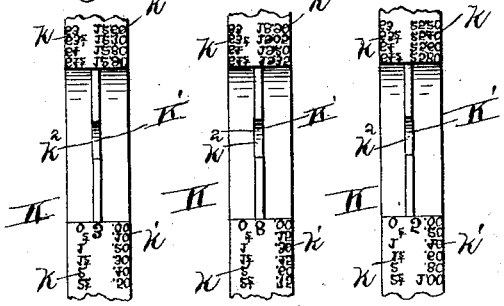
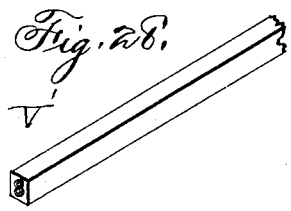
Witnesses:
Chas. H. LaPorte
M. B. May
Inventor:
John W. Poler
by
Doubleday & Shea attys.
ANDREW B. GRAHAM, PHOTO-LITHO, WASHINGTON, D.C.

UNITED STATES PATENT OFFICE.

JOHN W. POLER, OF BROOKLYN, NEW YORK, ASSIGNOR TO WILLIAM B. ALLEN, OF TRENTON, NEW JERSEY.

TIME-RECORDER.

SPECIFICATION forming part of Letters Patent No. 547,156, dated October 1, 1895.

Application filed October 24, 1893. Renewed February 26, 1895. Serial No. 539,811. (No model.)

*To all whom it may concern:*

Be it known that I, JOHN W. POLER, a citizen of the United States, residing at Brooklyn, in the county of Kings and State of New York, have invented certain new and useful Improvements in Time-Recorders, of which the following is a specification, reference being had therein to the accompanying drawings.

This invention relates to an improved mechanism whereby a number of useful purposes can be attained; but it is more particularly applicable for the recording of fractions or periods of working-hours and for recording and readily indicating the sums of money due at the ends of the said fractions or periods of time, respectively.

Figure 1:
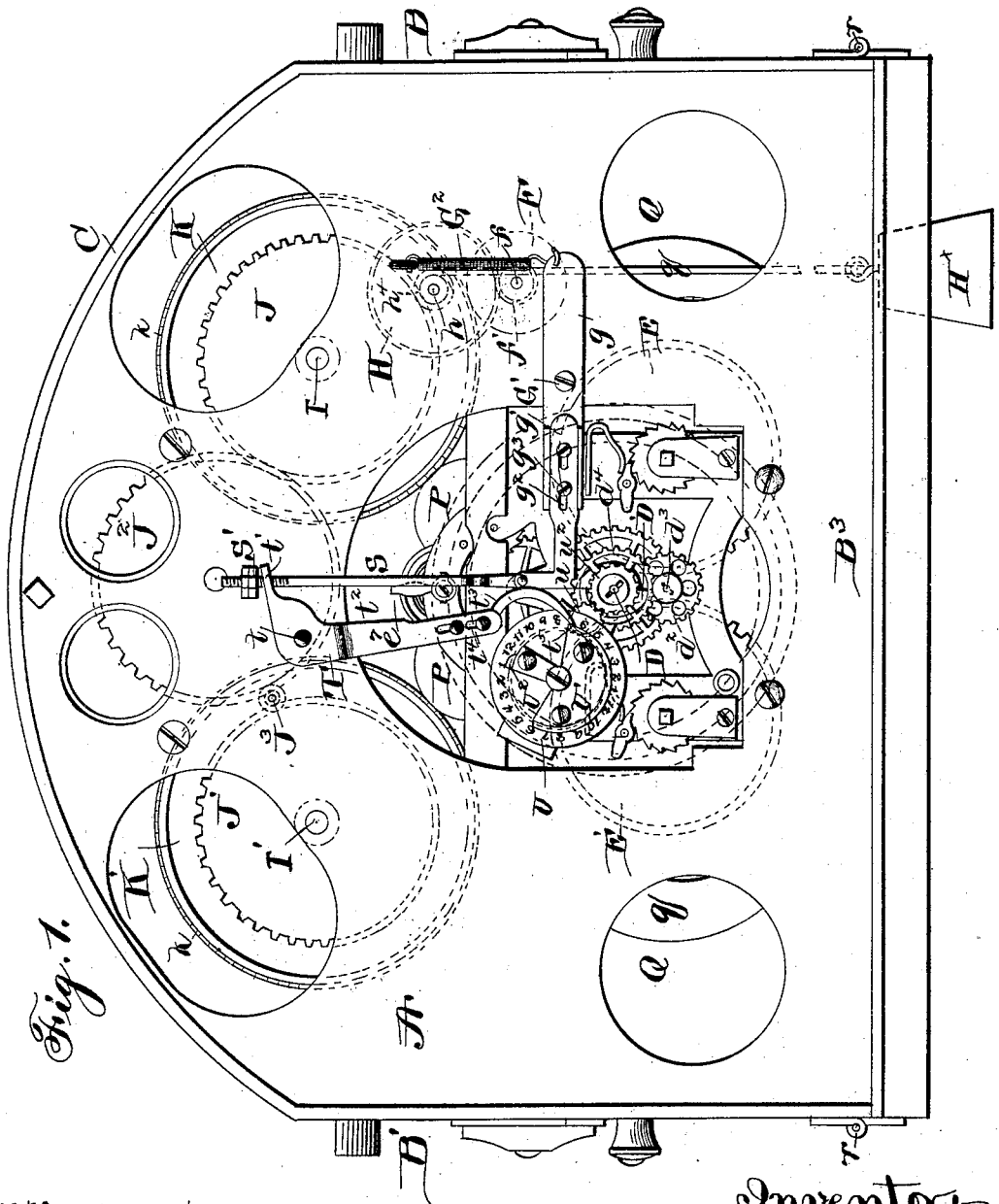
Figure 2:
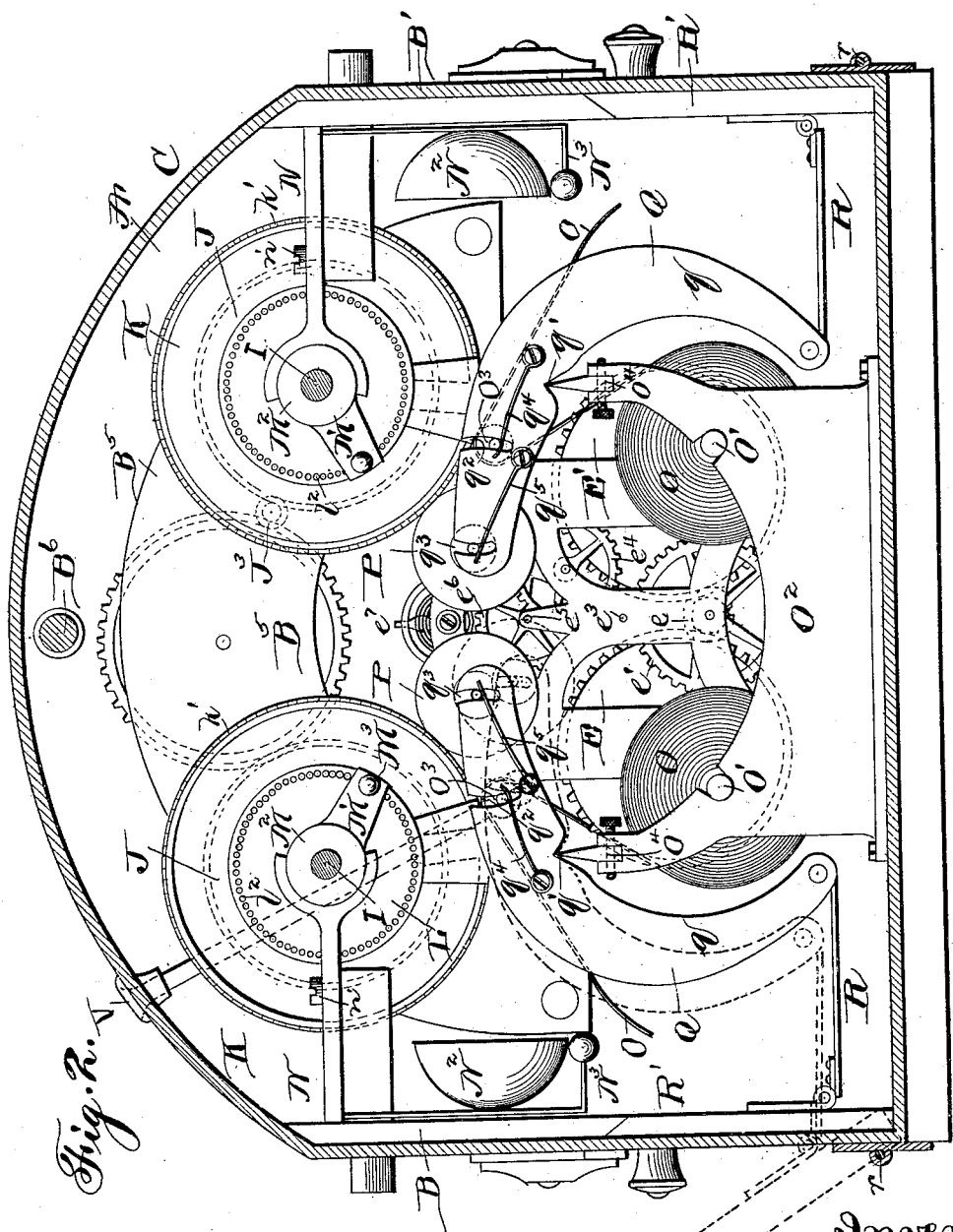
Figure 3:
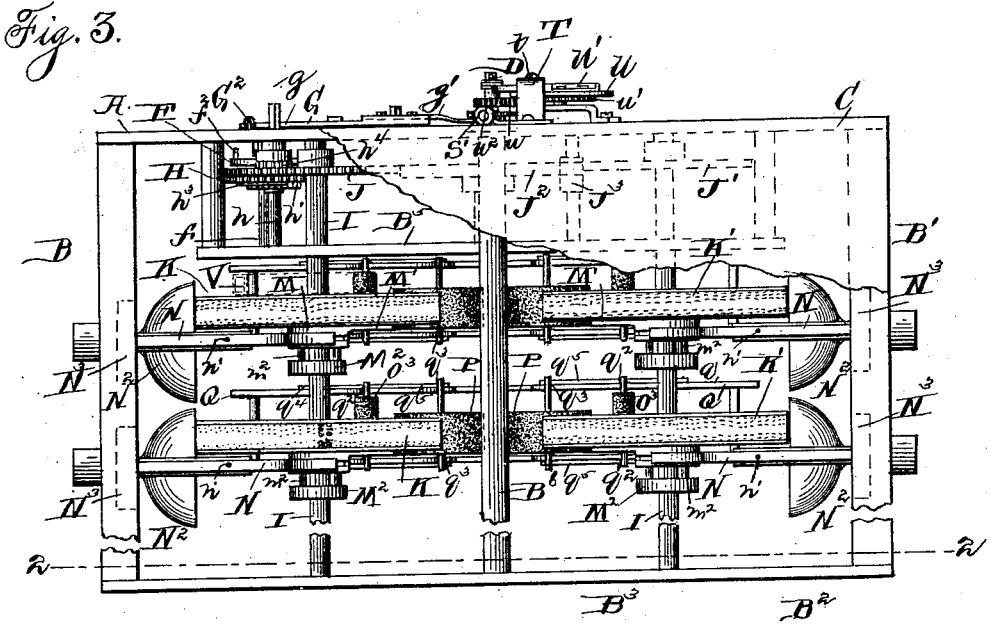
Figure 4:
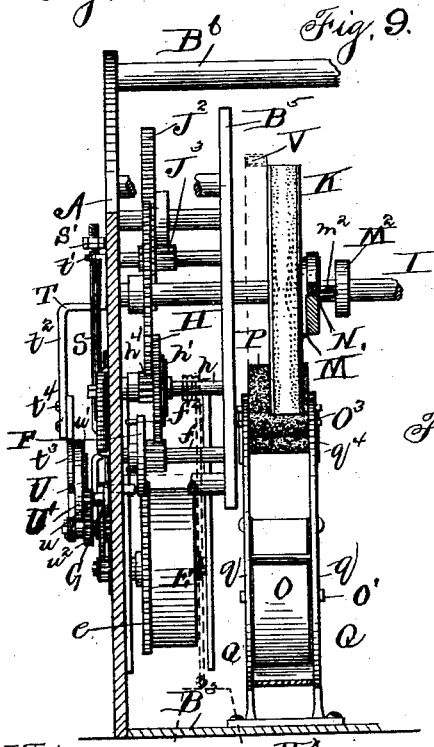
Figure 9:
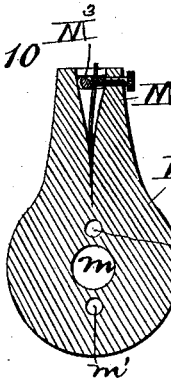
Figure 8:
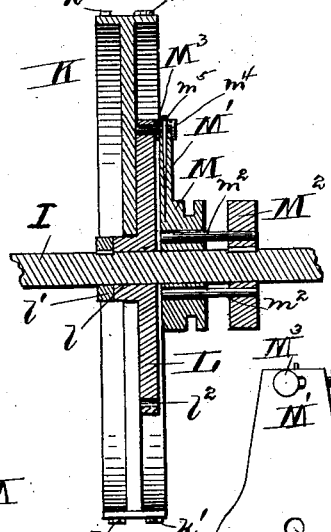

Figure 1 is a front end elevation of a mechanism embodying my improvements. Fig. 2 is a rear end elevation of the operative parts, the housing or casing being taken in section on the line 2 2, Fig. 3. Fig. 3 is a top view with a portion of the cover or casing removed. Fig. 4 is a view of part of the mechanism adjacent to the front wall of the casing. Fig. 5 is a perspective of the tripping mechanism interposed between the clockwork and the recording devices. Fig. 6 is a perspective of the more essential parts of the recording devices. Fig. 7 is a face view of the disk which supports the recording-wheel. Fig. 8 is a section of the recording-wheel, its supporting disk, and the clutch. Fig. 9 shows a part of the tape or paper upon which the record is imprinted. Fig. 10 is an enlarged transverse vertical section of the clutch and its arm. Fig. $10^a$ is a face view of the same. Fig. 11 is a face view of the recording-wheel detached. Fig. 12 is a section of the lock which controls access to and motion of the clutch-lever of the recorder. Fig. 13 is an inside face view of the lock. Figs. 14 and 15 are a face view and a section, respectively, of the filling-piece $K^3$. Fig. 16 is a detailed view showing in addition to the parts in Fig. 5 the stop for preventing the release of the recording-motor. Figs. 17, 18, and 19 are respectively a face view, an edge view, and a horizontal section of the stop detached. Figs. 20 and 21 show the cam mounted upon the hour-arbor. Figs. 22, 23, and 24 show the lever actuated by the cam shown in Figs. 20 and 21. Figs. 25, 26, and 27 show portions of three different type-wheels. Fig. 28 shows in detail the stencil used for indicating the separate jobs of work performed.

In the drawings I have shown a casing or housing having the front end wall A, the side walls B B', the rear wall $B^2$, the top or cover C, and the bottom $B^3$. This casing may be made in any suitable way, so as to prevent tampering with the mechanism or access to the interior except in cases of authorized parties, who can obtain such access through means to be described. The front and back end walls are spaced and braced by means of longitudinal bars $B^6$ of any suitable number. Within this casing is mounted a separate mechanism for each of several operatives, whereby he can keep his own time of working, and such mechanism is exclusively under his control. At a suitable place between the front and back walls A and $B^2$ there is an intermediate support $B^5$, parallel to the walls aforesaid and for the purpose of supporting parts which will be described.

The prime actuating and controlling mechanism which I employ is a clock-movement, and which may be of any preferred or suitable sort. That shown is more or less of an ordinary character, it having the arbor D for the hour and minute hands, it supporting the sleeve $d$, which carries pinion $d'$, meshing with wheel $d^2$, which carries pinion $d^3$, which drives wheel $d^4$, to which is secured the hour-hand, the parts just described constituting the ordinary "dial-train." They are referred to thus in order to call particular attention to the peculiarly-shaped cam D', (see Fig. 20,) which is secured to sleeve $d$ back of or behind the pinion $d'$. It has two cam portions $D^2$, which come into action upon parts to be hereinafter described once every half-hour, this cam being secured to the sleeve of the minute-hand. The clockwork is actuated by one or more, preferably two, springs, (not shown,) being arranged within spring-barrels, as at E E', the spring-gear imparting motion to the arbors of the hands and to the escapement $e^7$ by the ordinary means, comprising gear-pinions and wheels $e$ $e'$ $e^3$ $e^4$ $e^5$ $e^6$; but, as above said, the details of the clock mechanism may be varied, if desired. Every thirty minutes the cam D' causes the recording devices to be actuated, as follows: $h$ is a motor-shaft, preferably the shaft or arbor of a spring or weight H$^\times$, independent of and supplemental to the springs E E', it having a ratchet-wheel $h'$ and pawl $h^2$, with spring $h^3$ to prevent retraction under the reaction of the motor, and having a gear-wheel H, which engages with pinion $f'$, fast upon a shaft $f$, to which is keyed or otherwise rigidly secured an escapement-disk F, and a pinion $h^4$, which imparts power intermittingly to the recording-wheel K. This motor-shaft $h$ is permitted to rotate more or less by the escapement mechanism, which is controlled by the above-described cam D' on the minute-hand arbor, and which controlling is accomplished as follows:

G indicates a lever preferably made in two parts $g$ and $g'$, being pivoted at G' to the dial-plate or other suitable support. The part $g'$ is secured to the part $g$ longitudinally adjustably by slots at $g^2$ and set-screws at $g^3$. The end $g^7$ is bent inwardly and is so arranged as to be impinged upon by the aforesaid cam parts D$^2$ of the device D'. (See Fig. 5.) The object in constructing the lever G with the adjustable part $g'$ is for the purpose of adjusting the said part $g'$ relatively to the cam-wheel D' without affecting the relationship of the part $g$ of the lever and the escapement-disk F. If it is desired to have the escapement-disk F advanced one step a half-minute before the half-hour or a half-minute after the half-hour is indicated by the controlling-clock, it is merely necessary to slide the part $g'$ a little to the left or to the right. If it is advanced to the left, it will be lifted by the cam parts $d^2$ and allowed to drop just before the half-hour is indicated by the clock, and if advanced to the right it will drop after the half-hour is indicated. It will be seen that at each half-hour the inner end of the lever G will be raised and the outer end lowered. The inner end is held normally down by means of a spring G$^2$. The outer end of this lever carries an inwardly-extending arm $g^4$, which has two pins or projections $g^5$ $g^6$ situated at different radial distances from the pivot G'.

The spring, weight, or other energizer H$^\times$ connected with the motor-shaft $h$ tends to rotate the escapement-shaft $f$ through the wheels H and $f'$.

F is a disk on the escapement-shaft, having pins or fingers $f^2$ projecting outwardly therefrom. When the parts are in their normal positions, one of the pins $f^2$ rests against the projection $g^5$, carried by lever G; but when one of the cams D$^2$ elevates end $g^7$ of the lever and depresses the other end said pin $f^2$ on disk F will move (under the action of the spring or weight transmitted through the said gearing H $f$) a very short distance and come in contact with the projection $g^6$, also secured to the lever. Then as soon as the cam D$^2$ passes out from under the end of lever G and the spring G$^2$ draws up the outer end of the lever, the projection $g^6$ is pulled away from in front of the pin $f^2$, and the latter with its disk F makes part of a rotation, which is stopped by the next pin $f^2$ impinging upon the projection $g^5$.

It will be seen that by these devices every half-hour a step-by-step movement is permitted, and this is utilized for the operating of the recording devices, which are constructed and arranged as follows: I indicates a shaft mounted perpendicularly to the face of the instrument and which may be as long as is desired, it being utilized to support one or any preferred number of recording-wheels. It is intermittingly turned by a wheel J, secured to it and meshing with a wheel $h^4$ on the motor-shaft $h$.

I will now proceed to describe the recording mechanism, of which there is one for each operative. As they are all alike, I shall describe only one of them. The recording-wheel is indicated as a whole by K. It is preferably detachable at any instant from its supporting-shaft, so that one or another of a number of interchangeable wheels can be used. To have it thus readily inserted or withdrawn, I use a disk L with a hub $l$, and the recording-wheel itself K is formed with keyhole-slots, as shown at $k^3$ $k^3$, Fig. 11, which are adapted to register with the screws $l^3$ $l^3$ on the disk L. The wheel K has a slot K' extending from the periphery to a central aperture $k^2$, so that it can be readily brought to a central position upon the hub $l$, as is clearly shown in Fig. 8, and in which position it will be securely held by the screws $l^3$ in the slots $k^3$. $l'$ is a collar keyed to the shaft I and forming a shoulder or abutment to receive the lateral pressure or thrust of the parts above described. To close the slot K' of the wheel K, I employ a filling-plate or closing device K$^3$, of metal, which may be slipped on said wheel and is held stationary in place by fingers K$^4$, fitting in apertures $k^4$ in the said wheel K. The edge K$^5$ of the plate K$^3$ extends across the gap at the end of the slot on the said wheel and provides a continuous peripheral surface. After the desired wheel K has been inserted into its place, it will be seen that it and the disk L are practically a unitary structure, though separable from each other, and become the equivalent of a single wheel or disk mounted loosely upon the shaft. It will also be seen, when recalling the parts hereinbefore described, that the shaft I has an intermitting rotary or step-by-step motion imparted to it once every thirty minutes. This motion, however, is not necessarily imparted to the recording-wheel K. The wheel K can, however, be connected to the shaft as follows: M$^2$ is a collar keyed to the shaft and carrying feather-pins $m^2$, which fit in apertures in the part M. M is a clutch-hub sliding on these pins and therefore rotating with the shaft. The clutch has an arm M' which projects out sufficiently far, it carrying a clutch-pin M$^3$ parallel to shaft I and at a radial distance equal to that of a series of apertures $l^2$ in the disk L. (See Fig. 8.) This clutch-pin $M^3$ enters one of the apertures $l^2$ when the clutch is moved toward the wheel K. N represents a clutch-lever, which engages with a hub M and is supported on a pivot at $n'$. The outer end of it is connected with a lock at N'. The latter is operated by a key, each operative being provided with one for his particular recorder, and when the key is inserted the lever N can be moved one way or the other, so as to engage or disengage the clutch M and the pin $M^3$ from the disk L. Each recorder is assigned to an operative or employé—as, for instance, in a factory where it is desired to have a record of time automatically kept—and such party has the control of the recording acts of the mechanism. When he wishes them to commence, he inserts his key, as aforesaid, and moves the clutch M inward until it is engaged with the disk L and through the latter with the recording-wheel K, and thereafter a record will be made at each half-hour that the clutch remains in engagement, the recording being effected as follows: The wheel K is provided with a series of devices adapted to form characters to indicate intervals of time or amounts of money, or both, preferably the latter. Means for this purpose may be of any of several kinds. I prefer to have a series of raised type, as at $k$, for indicating half-hours successively and another series of type, as at $k'$, for indicating the amounts of money respectively earned at the ends of the periods of time indicated by the adjacent type aforesaid. O represents a paper tape, which is introduced as a roll having its axis O' mounted in a support $O^2$. The tape passes from the roll over a platen-roll $O^3$, and as the recording-wheel K rotates the type on its periphery print corresponding characters on the tape, the latter being also advanced by the pressure exerted on it by the wheel K. The type are inked by an inking-roll P, which is so situated as to come into contact with them immediately prior to their reaching the platen-roll $O^3$. As it is desirable to throw the printing mechanism out of action at times, the platen-roll $O^3$ and the inking-roll P are mounted in a pivoted frame Q. As shown in Figs. 4 and 7, it is formed of two main bars $q\ q$, and is pivoted at $q'$ on the above-described frame $O^2$, the latter having a cross-bar $O^4$, fitted in the recess in the under side of the bars $q$. The shaft of the platen-roll $O^3$ and that of the inking-roll P are mounted in slots at $q^2\ q^3$, respectively, and rest upon upwardly-acting springs $q^4\ q^5$, which tend to press the rolls against the recording-wheel K. R is a link connected to the lower end of the frame Q, and by means of it the frame can be rocked on its pivotal support at $O^4$ in such way as to lower the platen-roll and the inking-roll away from the recording-wheel. The link R is connected at its outer end to a door R', hinged at $r$, and when this door is opened the draft exerted on the link R results in depressing the rolls in the way described. There may be one door for each of the recording mechanisms, to which the link R of each is pivoted, or all the links R may be pivoted to a single door.

The manner of using a mechanism of the character described will be readily understood from the drawings and the foregoing description. For instance, let it be supposed that an operative or employé is to commence using the instrument at the first of the week, the following steps are taken: Normally, the clutch M is at that time out of engagement with the disk L and wheel K. The shaft I may have been intermittently rotating, but no record will result, owing to this disengagement. If the operative arrives at his place of employment before seven, he inserts his key in lock N' and it throws the lever N so as to cause the clutch M to engage. At this time the recording-wheel K has its zero-point (0) near the platen-roll. At the hour of seven the cam D', through lever G, allows the escapement-disk F to move one step, in the way above described, and the described gearing, through the clutch M, causes the recording-wheel K to move far enough to produce the characters shown at the bottom of Fig. 9—viz., "0" "7" ".00." The recording mechanism after this continues to operate in the way set forth at each half-hour—that is to say, at the end of the second actuating the characters "$\frac{1}{2}$" ".10" are printed on the tape; at the third the characters "1" (hour) ".20," and so on. This operative is employed at the rate of twenty cents an hour, so that as the successive characters indicating the hours are recorded, the wages due are recorded at the same time opposite them. Then, at the noon hour, for instance, the operative again inserts his key and throws the clutch M out, and thereupon the recording-wheel ceases to act until he again engages the clutch at the close of the noon hour—viz., one, p. m. In this way an accurate record is kept of the hours and fractions thereof during which he is employed for one or more days, and also the wages to be paid. I prefer to construct the recording-wheels of such dimensions as to furnish a record of the ordinary number of working-hours for a week. At the end of the week the timekeeper unlocks the door R' and ascertains at once from the tape the total number of hours of work and the total amount due therefor. His act of opening the door R' instantly throws downward the platen-roll and inking-roll, as above described, so as to prevent any marring of the record. After removing, or at least examining the tape, he places the recording-wheel at the zero-point, ready for another week's record. It will be understood that the type or other marking mechanism on the recording-wheel K will be varied to correspond with the wages which the operative is to receive. The type may be so mounted upon the wheel as to be removed for the insertion of other type indicating different wages, but preferably this end is attained in the way above described—that is to say, by having removable and interchangeable recording-wheels showing different amounts of money to correspond with difference in wages.

Each instrument can be made so as to furnish records for a large number of parties, it being merely necessary to mount upon the shaft or shafts I a series of mechanisms having duplicates of the mechanisms K L M, &c., above described. I have shown two of these shafts I, adapted to be actuated by a single motor and governed by a single clock mechanism, the second shaft receiving power from the wheel J through a series of gears $J^2$, $J^3$, and $J'$. Each recording mechanism in the series is provided with a clutch-lock, to which is fitted its own peculiar key to be kept by the employé to whom it is assigned. If a tight casing is used, or one having no means permitting inspection of the interior, a bell can be combined with each recording mechanism in such way that the movement of the clutch will be clearly indicated. Bells are shown at $N^2$, and their hammers $N^3$ have each an arm which lies in the path of the lever N or parts connected therewith. (See Figs. 3 and 13.)

I have now described a recording mechanism which can be used without any limit, except that incident to the employé's throwing the clutch out and in; but under some circumstances it is desirable to have an automatically-actuated mechanism which shall positively prevent the movement of any of the parts from and including the escapement-disk F. To accomplish this I combine with the trip-lever G the following parts, which constitute, essentially, a clock-controlled limiting device for the movement of said lever: S (see Fig. 16) is a link pivoted to the lever G and preferably extending upward therefrom. With it there is combined a two-part adjustable stop. One part is secured to the link S, it being preferably of the form of an adjustable nut $S'$. The other part of the stop is a lever T, pivoted at $t$ and having its end $t'$ in the path of the nut $S'$, link S passing through an aperture in the said end $t'$, thereby supporting said link S in an upright position. The lever T is preferably made in two parts $t^2 t^3$, adjustably secured together at $t^4$, the lower part being curved, as shown. U is a disk having a stop $u'$ lying in the plane of the part $t^3$ of lever T. This stop, as shown, is a flange which extends around a little more than one-half the circle of the disk U. There is also a smaller stop or flange $U^2$, which extends but one-twelfth of the circle of the disk U and is situated directly opposite the flange $U'$. The lever T has its lower end $t^5$ normally pressed toward the axis of the disk U, because of the tension of spring $G^2$, which tends to lift the outer end of lever G, thereby drawing down upon link S, which in turn draws upon the end $t'$ of lever T. The disk U is rotated once in twenty-four hours by gear-wheels $u$ $u'$ $u^2$ so related to the dial-train that one rotation of the disk U, as aforesaid, in twenty-four hours will be produced.

From examination of the drawings it will be seen that the following ends can be accomplished with the devices last described: If the working-hours are from seven in the morning until six in the evening, the stop-flange $U'$ is adjusted on the face of the disk U, so as to extend from seven around to six. Therefore, the lever T will at seven o'clock have its lower end $t^5$ free to swing to the left, as seen in Fig. 16, and its upper end $t'$ will no longer support the link S, and therefore the lever G can be dropped at the inner end and elevated at the outer end, when the cam $D'$ escapes from the inner end, which happens, as above described, at seven o'clock. Thereafter the recording mechanism will operate every half-hour, as set forth, (there being nothing to interfere with the free rising and falling of the lever G,) until the noon hour (twelve o'clock m.) is reached, at which time the smaller cam-flange $U^2$ has descended far enough to impinge upon the end $t^5$ of lever T and push it to the right, and in so doing elevate the upper end $t'$ to such position as to prevent the link S from dropping, which holds the lever G in its inactive position; but as soon as the short cam-flange $U^2$ moves around away from the end $t^5$ of the lever T (which escape occurs at one p. m.) the lower end of the lever is again free to swing to the left, and there is no impediment to the free rising and falling of the lever G until the hour of six p. m. is reached, at which time the longer cam-flange $U'$ reaches the end $t^5$ of the lever T, and again pushes it back to the right, so as to lock the link S and lever G against movement. The levers T and G will be held in this locked position by the cam-flange $U'$ from six in the evening until seven in the morning. With a mechanism of this sort I am enabled to positively guard against accidental or improper action of the recording mechanism. A mechanism of this sort can also be readily utilized for recording the time devoted to "job" work. To accomplish this, use is made of a supplemental marking device, such as a rod $V'$, carrying a type or equivalent, which can be passed through the casing and down a guide-tube such as that shown at V, (see Figs. 2 and 7,) the lower end of which is immediately over one of the edges of the paper tape at the point of printing. The type on the end of this rod $V'$ indicates the serial number of the job, and the characters are imprinted opposite the hours of commencing and finishing. Thus, by referring to Fig. 9, it will be seen that the number "8" occurs at two places on the tape, respectively, opposite "$3\frac{1}{2}$" and "$9\frac{1}{2}$," indicating that the eighth job of this operative occupied him for six hours.

While I have thus referred in detail to the manner of using this mechanism for the recording of the several times and wages of operatives, I do not limit myself to such uses, as there are many purposes to which devices of this sort can be applied.

I have above described the steps taken by the operative if he arrives at his working-place prior to seven. It will be understood that if he is too late to insert his key into the lock N' at or before seven he will be unable to have any characters recorded on the paper until 7:30, even though he should throw the clutch M into engagement with the recording-wheel. In other words, the record commences at the first half-hour next after his insertion of the key and moving the clutch; and so, too, is stopped from and after the instant of his throwing the clutch out.

I am aware of the fact that heretofore recording devices have been used or proposed in which there was a series of tapes containing rows of characters indicating hours and fractions of hours, and also characters indicating amounts of money. These earlier mechanisms are illustrated in a patent to Fuller, No. 379,865; but in these mechanisms there was not a recording device, properly speaking, of the character of mine—that is to say, a recording device which indicates at any time the sum total of the hours of actual occupation and the total wages therefor earned by an employé on a removable record. In using the earlier devices referred to it was necessary to make several calculations in order to decide as to the amount of time, of work, and of money due. The time-keeper had to note the time of commencing and the time of stopping at each period of work (through a week, for instance) and then ascertain the sum total, and finally calculate therefrom the amount of wages due. In the present case these ends are all attained automatically by the recorder—that is to say, I have a recorder which indicates on the tape that is removed, first, a series of numbers increasing by arithmetical progression the several periods of time; second, the sum total of these several periods, and, third, the sum total of money due for such time.

In other earlier mechanisms of this class use has been made of perforated time-records, the mechanisms and the records being in principle substantially similar to those above described. I avoid the expense and trouble necessary to prepare the special record-strips and to properly insert and register them in the mechanism, as I employ a recording device which produces its own record characters while the machine is in operation. However, I know, also, that use has been made or proposed of a record device having type-wheels—as is shown, for instance, in Patent No. 393,205 to W. L. Bundy; but the mechanism therein shown differs still more widely from the present one, from the fact that the party inserting the key himself causes the printing of the characters which indicate the time of his commencing and stopping work and no hours or fractions thereof being indicated between said hours. The making of a mark on the record requires the insertion of the key. In my case the recording mechanism is adapted to produce a continuous series of gradually-increasing numbers irrespective of whether or not the key remains inserted.

What I claim is—

1. In a time recording mechanism, the combination with the clock mechanism of an automatic recording device adapted to produce a removable visual record presenting characters representing numbers increasing in arithmetical progression and means controlled by said clock mechanism for automatically advancing said record, substantially as set forth.

2. The combination with the clock mechanism of an automatic recording device, an inking mechanism, an unmarked paper or tape means for holding the paper or tape relatively to the recording device continuously in the position for receiving record characters and means controlled by said clock mechanism for automatically advancing said record, substantially as set forth.

3. The combination with the clock mechanism of the recording device adapted to produce a series of characters upon a paper or tape, an inking mechanism, a holder for the paper or tape which is adapted to retain it continuously in the position occupied for the forming thereon of characters by the recording device and means controlled by said clock mechanism for automatically advancing said record, substantially as set forth.

4. The combination with the recording device provided with a series of type substantially as described, an inking mechanism, and a paper holding device which retains the paper under pressure against the recording device, of two motors, one of which drives the recording device, an escapement interposed between said motors whereby one regulates the movement of the other and means actuated by the motors for automatically advancing the paper, substantially as described.

5. The combination with the recording device adapted to print a series of numbers increasing in arithmetical progression, an inking mechanism, and a platen or paper presser, of a driving shaft adapted to move continuously in one direction, a motor for said shaft, and means for connecting the recording device with said shaft and disconnecting it therefrom independently of said motor, substantially as set forth.

6. In a time recording mechanism, the herein described recording device provided with means for producing a series of differing numeral characters, in combination with a motor for continuously moving said recording device, said recording device being detachably connected to said motor, substantially as set forth.

7. The combination of a recording device having a series of successively acting type indicating a series of hours or fractions thereof, a motor for actuating said recording device, and means for connecting and disconnecting said motor and recording device at will, substantially as described.

8. A time recording device provided with a series of type adapted to print characters indicating in arithmetical progression a series of hours or fractions thereof, a clock mechanism for actuating said record device and means for disconnecting them at will, substantially as described.

9. In a time recording mechanism, a rotary power shaft and a recording wheel rotatable thereby and mounted thereon and detachable therefrom at will, substantially as described.

10. In a time recording mechanism, a motor, a power shaft rotated thereby and a time recording wheel detachably mounted loosely thereon and means independent of the motor for connecting said wheel positively to said shaft at will, substantially as described.

11. The combination with the slotted recording wheel, of means stationarily secured thereto for permanently closing its periphery, substantially as set forth.

12. The combination with the recording wheel having a slot extending from the periphery to the center of the loosely mounted hub for supporting it on the shaft and means for automatically rotating said wheel uniformly, as described.

13. The combination with the recording device, of the motor therefor, the stop for said motor, the motor for removing the said stop, and the controlling device actuated by the second motor for preventing the said stop from being moved, substantially as set forth.

14. The combination with the type carrying wheel detachably engaging with a power shaft, whereby said wheel can be stopped or started at will, of the paper support adapted to hold the paper stationary when said wheel is stationary and the ink roll, substantially as set forth.

15. The combination with the type carrying wheel, the motor, and the means for detachably connecting the wheel to the motor at will, of the inking roll and the paper support and platen adapted to be moved away from the type wheel, substantially as set forth.

16. The combination with the type carrying wheel mounted in a casing, of the inking mechanism, the paper support or platen mounted in a movable carrier, the door in the casing and the means connecting said door with the said movable carrier, substantially as described.

17. The combination with the type carrying wheel and the motor adapted to be detachably connected thereto, of the inking mechanism and the paper support or platen both mounted in a movable carrier, whereby both may be withdrawn from the type carrying wheel substantially as set forth.

18. The combination with the recording wheel, the motor, and the means for detachably connecting them together, of means for automatically preventing the action of the motor, substantially as described.

19. The combination of the motor, the stop therefor, the second motor, means whereby the second motor removes the stop from the first aforesaid motor, and a series of independent duplicate time recording devices actuated by said motor, and means for connecting the recording devices with and disconnecting them from said motor whereby they are adapted to be actuated separately or simultaneously substantially as described.

20. The combination with the type wheel, the motor, the means for detachably connecting the wheel and the motor at will, the inking mechanism, the paper support and means for automatically advancing the paper uniformly, of the tube or passage way extending to a point adjacent to the paper whereby characters may be formed thereon supplemental to those produced by the type wheel, substantially as set forth.

21. The combination with the recording mechanism and the clock mechanism of the lever G adapted to be actuated by the clock mechanism and to permit the action of the recording mechanism, and the spring $G^3$, substantially as set forth.

22. The combination of the recording mechanism, its motor, the escapement disk F having the pins $f^2$, the clock mechanism having the cam D' and the lever G adapted to be engaged by said cam and having stops for engaging said pins $f^2$, substantially as set forth.

23. The combination with the recording mechanism and the clock mechanism of the lever G formed in two adjustable parts $g\ g'$, and adapted to be actuated by the clock mechanism, substantially as set forth.

24. The combination with the type wheel the inking mechanism, the presser roll, the unmarked paper or record strip, and the intermittingly rotating shaft of the clutch connecting the wheel to the shaft, the lever for moving the clutch, and the key-operated lock for moving the lever, substantially as described.

25. The combination with the recording wheel K of the clutch having a loosely mounted clutch pin for engaging with the wheel and a spring bearing against the said pin, substantially as and for the purpose set forth.

26. The combination with the recording wheel K of the clutch M having the slotted arm M', the pin $M^3$ mounted in the slot and the spring $M^5$ bearing against the pin, substantially as set forth.

27. The combination with the recording mechanism, the clock mechanism and the lever G adapted to be actuated by the clock mechanism to permit the movements of the recording mechanism, of a stop for said lever G, and a wheel or disk actuated by the clock mechanism for moving said stop in and out of its operative position, substantially as set forth.

28. The combination with the recording mechanism, and the clock mechanism, of a controlling device interposed between them and actuated by the clock mechanism to permit the movements of the recording mechanism, a lever for supporting said controlling device and an adjustable stop movable by the clock mechanism and adapted to hold said lever in or out of its operative position, substantially as set forth.

29. In a time recording mechanism, the combination with the power shaft of the recording wheel having a series of type indicating a series of hours or fractions thereof and also a series of type indicating a corresponding series of sums of money due as wages at the ends of each of said series of hours or fractions thereof, of means for connecting said wheel with said power shaft and disconnecting it at will, substantially as set forth.

30. In a time recording mechanism, the combination of the recording wheel having a series of record producing devices, and a motor therefor, of connecting devices adapted to permit said wheel to be engaged at will with said motor, at points corresponding in number to the said record producing devices on said wheel, substantially as set forth.

In testimony whereof I affix my signature in presence of two witnesses.

JOHN W. POLER.

Witnesses:
MARCUS B. MAY,
H. H. BLISS.